United States Patent [19]

D'Onofrio

[11] Patent Number: 5,073,700
[45] Date of Patent: Dec. 17, 1991

[54] MARK SENSE DETECTOR WITH VARIABLE THRESHOLD

[75] Inventor: Enzo D. D'Onofrio, North Providence, R.I.

[73] Assignee: GTECH Corporation, West Greenwich, R.I.

[21] Appl. No.: 462,817

[22] Filed: Jan. 10, 1990

[51] Int. Cl.$^5$ .............................................. G06K 7/00
[52] U.S. Cl. .................................. 235/436; 235/455; 235/456; 250/556; 250/557
[58] Field of Search ............... 235/436, 454, 455, 462, 235/456; 250/556, 557

[56] References Cited

U.S. PATENT DOCUMENTS

| | | | |
|---|---|---|---|
| 3,303,329 | 2/1967 | Fritz | 235/61.11 |
| 3,692,983 | 9/1972 | Cucciati et al. | 235/61.11 E |
| 3,747,066 | 7/1973 | Vernot et al. | 340/146.3 |
| 3,751,636 | 8/1973 | Coles, Jr. | 235/61.11 E |
| 3,814,944 | 6/1974 | Berger | 250/555 |
| 3,846,623 | 11/1974 | Wefers et al. | 235/61.11 E |
| 3,872,329 | 3/1975 | Dodson | 307/311 |
| 3,949,233 | 4/1976 | Gluck | 250/555 |
| 4,047,023 | 9/1977 | Key et al. | 250/214 B |
| 4,162,408 | 7/1979 | Hansen | 250/555 |
| 4,196,845 | 4/1980 | Chesters | 235/462 |
| 4,230,265 | 10/1980 | Casaly | 235/455 |
| 4,335,301 | 6/1986 | Palmer et al. | 235/462 |
| 4,356,389 | 10/1982 | Quirey et al. | 235/455 |
| 4,578,568 | 3/1986 | Tsuzuki | 235/436 |
| 4,724,307 | 2/1988 | Dutton et al. | 235/455 |
| 4,870,262 | 9/1989 | Hasegawa | 235/436 X |

Primary Examiner—David Trafton
Attorney, Agent, or Firm—Eckert Seamans Cherin & Mellott

[57] ABSTRACT

A mark sense detector with a threshold detector having a weighted and variable threshold discriminates reflective variations on an illuminated surface such as a hand-marked lottery entry card having a plurality of tracks with potential reflective variations occurring at discrete positions thereon. The card is fed relative to an array of photodetectors for the tracks, each photodetector producing an input signal for a respective one of the tracks in response to reflections of the illuminated surface, the input signal varying with marks and with parameters of the illumination and feeding. The track input signals are applied to follower amplifiers for each of the tracks. An integrator for each of the tracks averages the output of the follower amplifier, the average being divided and applied as the threshold input to a comparator for each of the tracks. The integrator has different time constants for charging and discharging and is blocked by a diode against discharging through the follower, thereby favoring detection of marks. The division of the average level applied as the comparator threshold can be switchable as a function of card parameters. One of the detector channesl can be used for edge detection.

10 Claims, 3 Drawing Sheets

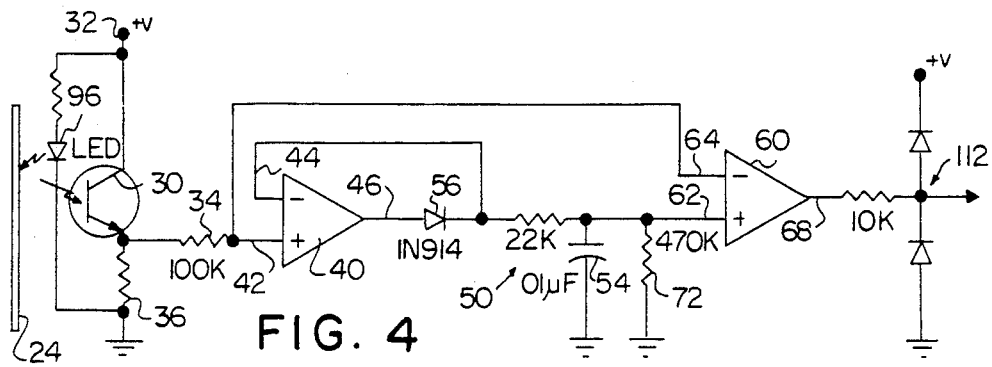
FIG. 4
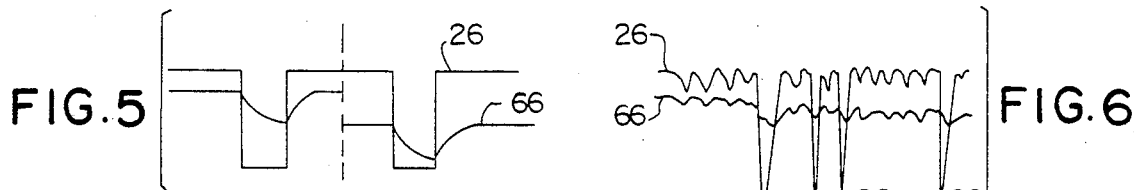
FIG. 5  FIG. 6
FIG. 7
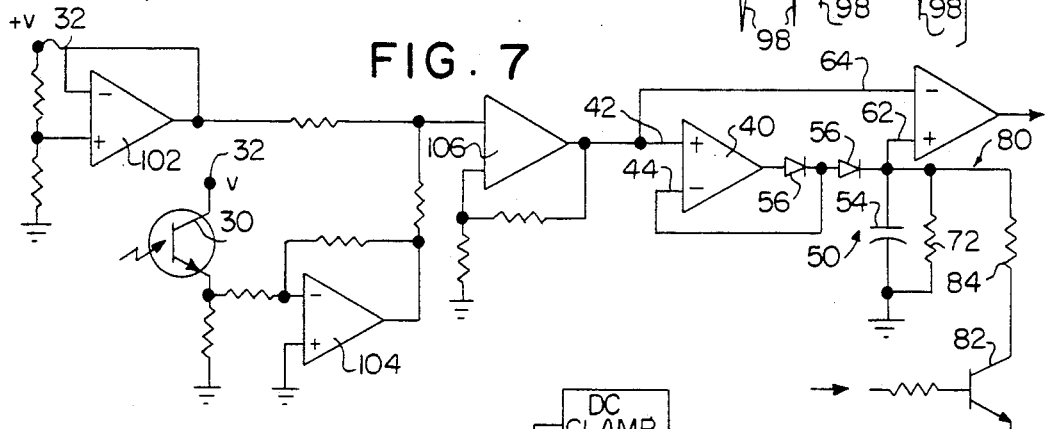
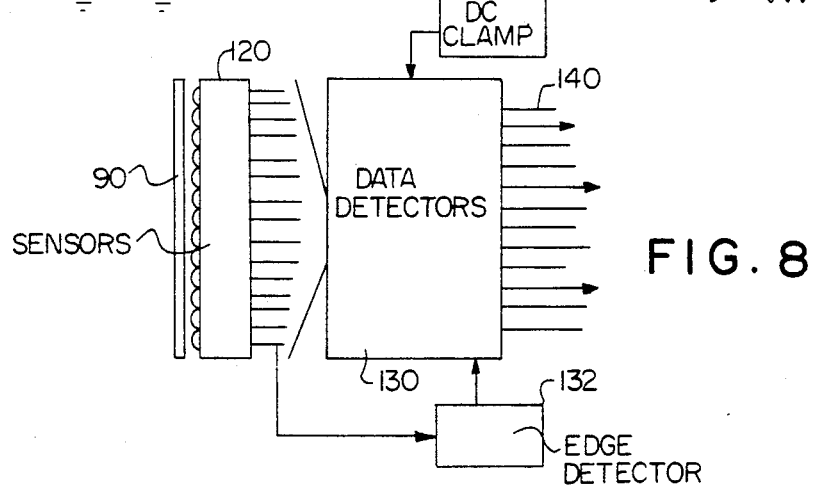
FIG. 8

MARK SENSE DETECTOR WITH VARIABLE THRESHOLD

BACKGROUND OF THE INVENTION

1. Field of the Invention

This invention relates to the field of electronic optical mark sense recognition apparatus for discriminating marks or holes on an illuminated surface, for entry of selected data. In particular the invention concerns a mark sense recognition apparatus especially for hand marked lottery entry forms bearing pencil or ink markings to encode selections, the apparatus being characterized by an adaptively variable threshold for distinguishing reflections of marks from the reflection of the background.

2. Prior Art

Mark sense recognition apparatus are known in connection with various data entry problems such as scanning of marked sheets or cards, bar-coded product labels and the like. Typically, marks in pencil, ink or punched holes are detected by measuring the change in reflectance of the sheet as it is moved relative to a photodetector, the timing and/or sheet position being related to the signal to provide information as to selections indicated on the sheet. The sheet or card can be illuminated in the red to near infrared band by a solid state (e.g., LED) or incandescent light source. The reflectance variations as measured by a detector (e.g., a photodiode or phototransistor) are converted into an electrical signal for each channel or track, and the signal is processed by a data detector or discriminator. Typically, at some point in the signal path, the reflectance signal is compared to a threshold for determining whether a particular reflectance variation is to be regarded as a mark or not.

In connection with scanning of sheets such as data entry forms having an array of potential mark positions which are selectively marked by a user with a pen or pencil for indicating a selection, or possibly provided with punched holes for indicating selections, particular problems are encountered. The feeding of the sheets past an optical detector, and the illumination of the potential mark positions produce a form of signal variation or noise that must be distinguished from the signals produced by marks or holes indicating selections.

The signal variations or noise are produced, for example by the vibration or "flutter" of the fed sheet, which displaces the illuminated surface of the sheet relative to the optical detector, thereby affecting signal strength during the time in which a sheet is read. The brightness of the illumination means and the sensitivity of individual optical detectors (typically photodiodes or phototransistors) can vary from unit to unit and also over time. Variations in the reflectivity of the sheet material itself also occur, and reflectivity is affected by dirt, erasures, and other factors affecting individual sheets as well as limited areas of a particular sheet.

It may be possible to overcome certain of the problems which produce variations in signal strength by using high precision feeding, illumination and detector means, and by frequently adjusting the threshold level. However, this is expensive in initial cost and in maintenance requirements. For example, it is possible to encode in parallel a pixel image of an entire sheet, thereby avoiding feed variations, and to use image processing algorithms to distinguish marked positions from unmarked ones. Such a system is disclosed in U.S. Pat. No. 4,724,307—Dutton et al. This technique avoids many of the problems associated with variations in illumination and reflectance, but is relatively expensive. It would be preferable if possible to overcome such problems in hardware, using inexpensive components.

Mark sense readers use various means to eliminate from the read signal all variations caused by effects other than marks, before the signal is processed by the data detector or discriminator. For example, the mark-receiving areas of the card or sheet are delineated with nonreflective ink (at the frequencies of interest). Temperature induced variations in component properties can be sensed and compensated, etc. The critical comparison accomplished by the routine data detector is simply then a comparison of the signal to a fixed threshold, usually defined by a fixed voltage reference. Such mark readers, however, are not well adapted to the practical problems of reading hand marked sheets, even assuming compensation. Fixed reference reading requires tightly matched electrical components, a very stable and flutter-free card feed path, a stable illumination source and detector insensitive to thermal and supply voltage variations, and typically must be carefully calibrated from time to time for optimum performance. Even with these provisos, the fixed reference mode of reading will be affected by sheet variations that cannot be eliminated in the reader, e.g., erasures, smudges, mark size variations, folds in the sheet, etc.

A number of known readers for labels or sheets attempt to resolve problems with variations in reflectivity by allowing the threshold to be varied to respond to variations between sheets or cards, or variations in illumination that cause the signal level to vary. The threshold level is made adjustable, but during the shorter term of a read cycle, the threshold level is fixed. The threshold which will be applicable to a particular read cycle can be set, for example, by a sample and hold device that sets the threshold slightly below the reflectivity level of the sheet as a whole, or perhaps at a level considered representative, such as an area of the sheet which should not contain marks. Often, this requires use of photodetectors in addition to those sensing individual channels or tracks. The objective is to cause the reader to respond to variations in reflectivity on a short term basis, as characteristic of marks, and to be insensitive to variations in the average signal level, as characteristic of component drift. Unfortunately, card flutter is a relatively short term variation.

Erased areas, smudges and folds occur frequently on hand written marked sheets, and less frequently on printed materials or bar code labels. Reading hand written sheets is also made more demanding by the fact that the size and darkness of hand written marks varies substantially among writers. Some writers darken an entire area, while others simply place an "X" or a line to indicate a mark, necessitating a very close threshold for detecting the marks. For these reasons, many of the techniques used for threshold setting in connection with reading bar codes or printed materials are less than adequate for hand written marks. The writer-induced variations aggravate problems with reader variations such as flutter, illumination variations and sheet reflectivity variation.

U.S. Pat. No. 3,747,066—Vernot et al discloses a circuit that sets a variable threshold level for recognition of printed characters based on the average light level in a region including a plurality of points being sensed as well as areas spaced laterally and longitudinally of the points. U.S. Pat. No. 4,047,023—Key et al sets the threshold by averaging the signal between areas of expected marks. U.S. Pat. No. 4,162,408—Hansen uses the level just prior to the occurrence of a potential mark. In each case the threshold is affected by variations in reflectivity outside the points of interest, i.e., the areas to which the photodetectors respond. This approach will cause the reader to respond somewhat differently to sheets which are clean vs. those which have localized darker areas, for example as is typical of erased areas, smudges and the like.

Techniques wherein a threshold level is set as a function of recently detected peaks in the read signal are disclosed, for example, in U.S. Pat. No. 3,846,623—Wefers et al; U.S. Pat. No. 4,335,301—Palmer et al; and U.S. Pat. No. 4,356,389—Quirey et al. The peaks, however, may or may not be peaks which are due to marks vs. peaks which are due to a representative sheet surface adjacent the marks, rendering such devices ineffective in instances of erasure or smudging. U.S. Pat. No. 4,196,845—Chesters attempts to improve responsiveness of detectors by wave shaping techniques. U.S. Pat. No. 4,230,265—Casaly provides a sample and hold circuit wherein the sampling is triggered at the commencement of a card read cycle. Other related disclosures can be found in U.S. Pat. No. 3,949,233—Gluck; U.S. Pat. No. 3,872,329—Dodson III; U.S. Pat. No. 3,814,944—Berger; U.S. Pat. No. 3,751,636—Coles Jr.; U.S. Pat. No. 3,692,983—Cucciati et al; and, U.S. Pat. No. 3,303,329—Fritz.

There is a need for a mark reader which is particularly adapted to reading hand written marks, which is tolerant of variations in sheet reflectivity and mechanical variations in flutter of the fed sheet, and which requires a minimum of components, preferably inexpensive and standardized components, such that a multichannel embodiment is feasible for reading a plurality of mark tracks disposed on a sheet or card. According to the invention, these requirements are met by independent and dynamically self-tracking read circuits for each of the channels of a reader. The dynamic self-adjustment of the read circuits compensates for variations due to slip quality and mechanical flutter. No adjustments are required for any segment of the circuits, either initially or in the field, and each channel independently compensates for itself. The preferred embodiment provides both data detection and slip edge or position information, thereby eliminating external sensor needs. The circuits function well at standard optical mark sense recognition feed rates (e.g., 28 inches per second, ±4 ips), can be adapted readily for use at other feed rates, and can be integrated as a bipolar large scale integrated circuit.

SUMMARY OF THE INVENTION

It is an object of the invention to provide a mark sense reader especially adapted to reading hand written marks, using a dynamically variable threshold technique rendering the reader insensitive to sheet flutter and illumination system variations, sheet quality variations and user marks apart from intended marks.

It is also an object of the invention to reduce the complexity and expense of a mark reader while improving performance.

It is a further object of the invention to provide a packaged universally applicable reader circuit that requires no calibration or adjustment whatsoever and operates over a range of illumination and sheet quality conditions applicable to the whole sheet or to just a channel or track.

It is still another object of the invention to provide a dynamically varying threshold reader wherein the data detector threshold is set to the average of the signal level for each individual channel and wherein the rate of integration to obtain the average is weighted to favor detection of marks.

It is yet another object of the invention to provide a standardized circuit for mark sense recognition that can function as a sheet edge detector, precluding the need for sheet edge detectors apart from the mark sense recognition circuits.

These and other objects are accomplished by a mark sense detector with variable threshold for discriminating reflective variations on an illuminated surface such as a hand-marked lottery entry card having a plurality of tracks with potential reflective variations occurring at discrete positions thereon. The card is fed relative to a photodetector for each of the tracks, each photodetector producing an input signal for a respective one of the tracks in response to reflections of the illuminated surface, the input signal varying with marks and with parameters of the illumination and feeding. The track input signals are applied to follower amplifiers for each of the tracks. An integrator for each of the tracks averages the output of the follower amplifier, the average being divided and applied as the threshold input to a comparator for each of the tracks. The follower output can be rectified to improve responsiveness to decreasing reflectance (indicating a mark). The division of the average level applied as the comparator threshold can be switchable as a function of card parameters.

BRIEF DESCRIPTION OF THE DRAWINGS

There are shown in the drawings the embodiments of the invention as presently preferred. It should be understood, however, that the invention is not limited to the precise arrangements and instrumentalities shown, and is capable of embodiment in other groupings of elements in accordance with the invention as claimed.

In the drawings,

FIG. 4 is a detailed schematic drawing of a first embodiment of the data discriminating circuit of the invention;

FIG. 5 is a signal diagram showing a theoretically perfect read signal and threshold signal, the threshold being switched at the time shown in broken lines;

FIG. 6 is a signal diagram showing a typical read signal and threshold signal;

FIG. 7 is a schematic diagram of an embodiment of the invention including threshold switching means and input signal level processing, for detecting the leading and trailing edges of a marked form;

FIG. 8 is a block diagram showing an embodiment of the invention including a plurality of channels and an edge detection feature;

DETAILED DESCRIPTION OF THE PREFERRED EMBODIMENTS

Figure 1:
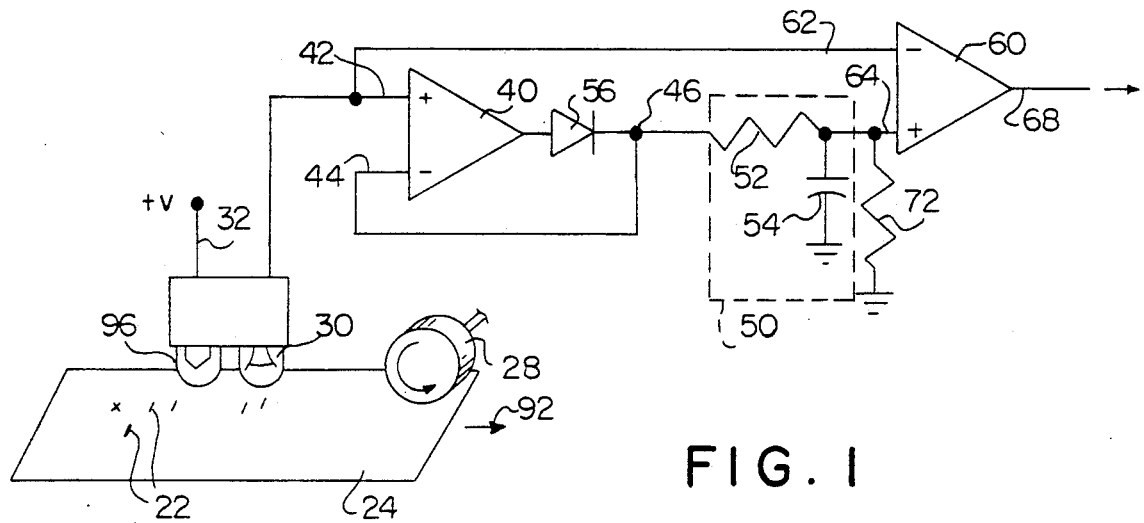
FIG. 1 is a schematic drawing showing a simplified representation of the data discriminating circuit of the invention together with a marked sheet and drive means.

FIG. 1 shows a schematic and simplified representation of the data discriminating circuit of the invention as functionally related to a marked card 24 and drive means 28. The apparatus is shown and described herein primarily with reference to a reader for the hand marked entry cards used to make player selections in lottery games. However, such use is only one of many possibilities, including other forms of hand-marked sheets as well as printed or punched forms wherein reflective light variations due to marks or holes can be sensed for entering encoded data into a register. The illuminated surface of card 24 and/or a photodetector 30 are moved relative to one another, for example by a motor driven friction wheel 28. In timed or position dependent manner, the light level (e.g., reflective or transmissive) variations 22 on the illuminated surface are correlated to the positions of potential marks and interpreted as players selections, UPC label codes, or other data entry information.

Figure 2:
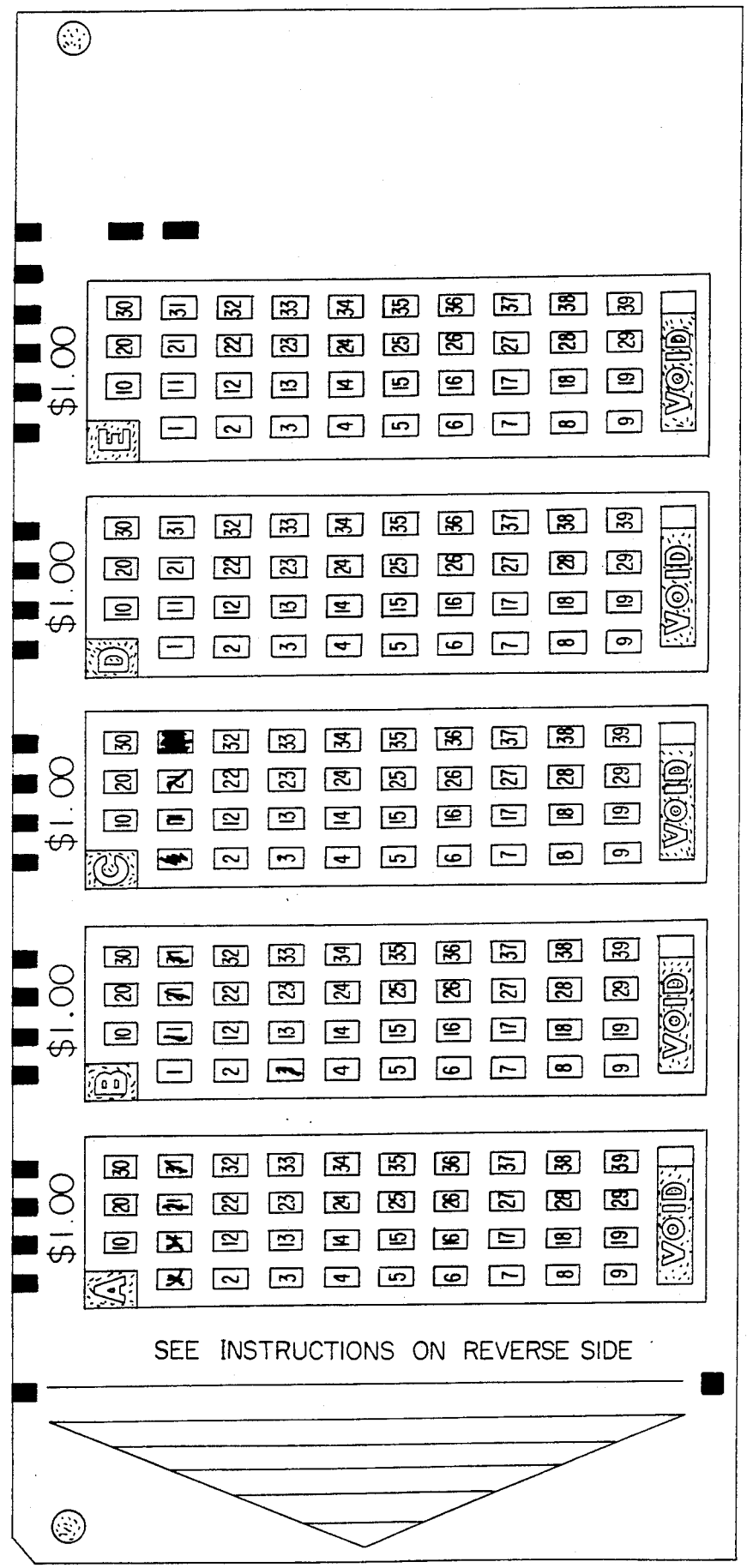
FIG. 2 is a plan view of a typical marked card, such as used for lottery entry forms.

FIG. 2 is a plan view of a typical marked card as used for a lottery entry form. The positions of potential marks are delineated by boxes on the card. Printed metering marks can be included, for example along the edge of the card, and used for triggering a sample of the light levels sensed along tracks or channels aligned in rows and columns. Preferably, twenty tracks are provided for reading across the rows of marks and/or timing marks on the card, each track or channel having an individual illumination means, photodetector and processing circuit according to the invention. The illumination means and photodetector can be packaged together or can be separate elements. The circuit can be embodied wholly or partly in an integrated circuit. The photodetector and illumination means can be placed in close proximity to the data bearing card, or one or both can be optically connected to the data bearing card by fiber optic lines. The card 24 is moved relative to the photodetectors 30 by a drive means 28. The drive means could be arranged to move the detector while the card remains stationary, but typically the card is moved past a stationary bank of detectors.

Sensing the data is complicated by the normal variation in the character and darkness of the marks which players place on the entry form cards, and also by the mechanical and electrical variations that inevitably occur in feeding, illuminating and reading the data. These variations include card flutter, namely the variation in spacing between the illuminated surface 24 and the illumination means and photodetector 30, resulting in corresponding variation in signal strength. The supply voltage to the detecting circuit varies with ripple on the power lines, loading of the power supply by the drive means 28 and other elements of the apparatus. The emission level of the illumination means and the sensitivity of the photodetector change with temperature and with aging, and vary from one element to another among the plurality of such elements employed for reading data on the respective tracks, i.e., the rows and columns of the card.

In order to enable accurate discrimination of marked positions from unmarked ones while rendering the apparatus insensitive to variations in signal strength which are not produced by marks, the circuit of the invention as shown generally in FIG. 1 and in more detail in FIG. 4, is responsive to variations in the light level received. The level as detected by photosensor 30 is compared to a dynamically varying threshold maintained by averaging the signal produced by the photodetector for each of the tracks, using an integrator.

Figure 3:
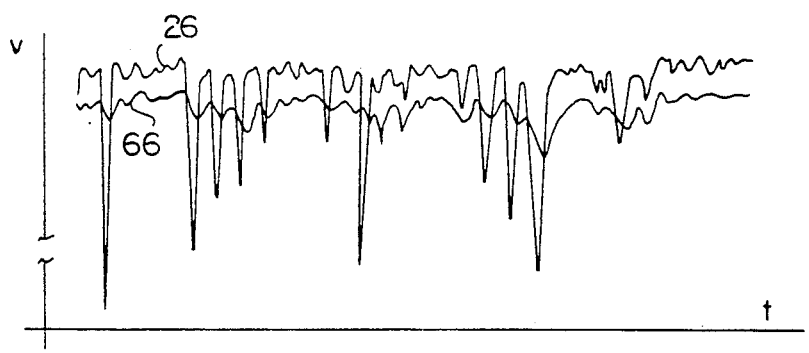
FIG. 3 is a signal diagram illustrating the read signal and the theshold signal in accordance with the invention.

FIG. 3 is a signal diagram illustrating the read signal and the threshold signal in accordance with the invention. The objective is to set the threshold level sufficiently close to the signal level that no marks 22 on the card 24 will be missed, but sufficiently below the signal level that none of the variations produced in the signal that are not due to marks will be interpreted erroneously as marks. This problem is complicated by the fact that the character and darkness of the marks varies substantially, for example as shown in the sample lottery entry card shown in FIG. 2. Read signal 26 (the upper of the two lines in FIG. 3) is characterized by a plurality of short term disturbances due to the above described effects such as power supply ripple or card flutter. The read signal can also vary over the longer term due to slower variations such as temperature and aging. If the threshold is set at a particular level which is optimized relative to the short term effects, such optimization will be lost eventually.

According to the invention, the threshold level is arranged to vary as a percentage of a weighted average signal level for each of the tracks. The signal produced by photodetector 30, which varies in voltage as a function of the reflected light level from the card, is passed through a follower amplifier 40 to avoid unduly loading the photodetector output. The output 46 of the follower amplifier 40 is applied to a dual rate integrator 50, defined for example by a resistor 52 in series with the output 46 of follower 40, and a capacitor 54 and resistor 72 in parallel thereto. One or more diodes 56 are inserted between the follower and the integrator, thereby preventing the integrator from responding too quickly to a negative excursion in voltage at the output of the follower.

The integrator preferably operates at different rates with respect to positive signals and negative signals, thus weighting the threshold comparison such that the detector reacts to negative signals in a more restrained manner than to positive signals. At the junction between the resistor 52 and capacitor 54, the voltage level increases or decreases exponentially over time to approach the voltage at the output 46. The rate of increase or decrease is a function of the time constants defined by the series resistance and parallel capacitance, and by the parallel resistance and parallel capacitance combinations, respectively, according to the functions: $e-t/R_sC_p$ (for charging the capacitor through the series resistor), and $e-t/R_pC_p$ (for discharging the capacitor through the parallel resistor). Therefore, a short term change on the voltage at output 46 of follower 40 results in a slower change at the junction of the resistor 52 and capacitor 54, and the rate of change can be set separately for positive and negative going signals. The junction of the capacitor 54 and the resistors 52, 72 is connected as one input 62 to a comparator 60. The other input 64 is connected to the input 42 of the follower amplifier, i.e., to the signal produced by the photodetector.

Integrator 50 is characterized by losses. The leakage of capacitor 50 and the load produced by the input to comparator 60 drain current from capacitor 50. These losses can be modeled as a second resistance in parallel with capacitor 54 and resistor 72, which resistances form a voltage divider together with the series resistance disposed between output 46 of follower 40 and the junction of resistor 52 and capacitor 54. Accordingly, the level of input 64 to comparator 60 maintains a percentage of the averaged (integrated) level of output 46.

The threshold percentage can be set to any arbitrary level, preferably about 89-93% for hand-marked lottery entry cards, by choosing the corresponding values of resistor 52 and resistor 72 that produce the desired percentage in the voltage divider, taking into account the leakage resistance of the capacitor and the input impedance of comparator 60. The value of capacitor 54 is then chosen in view of the value of resistor 52, to give the desired time constant. Suitable exemplary values for these components are shown in FIG. 4.

FIG. 4 is a detailed schematic drawing of a first embodiment of the data discriminating circuit of the invention, and also shows the particulars of the illumination means 96, which can be an LED, preferably emitting light in the red to near-infrared range. Light reflected by card 24 is received by photodetector 30, for example a phototransistor connected as an emitter follower. A decrease in reflected light (e.g., due to the appearance of a darkened mark on card 24) correspondingly decreases the extent to which the phototransistor conducts, thereby producing an increase in voltage at non-inverting input 42 to follower amplifier 40, and also at the output 46 of the follower. By positioning diode 56 between the output of the follower 40 and the series resistor 52 of the integrator, a positive direction voltage follower is created and the follower output does not discharge the capacitor 54 during low excursions. The diode is placed within the feedback loop of the follower, whereby the voltage divider can set any arbitrary percentage of the input signal level for use in the threshold comparison (i.e., without the diode voltage drop to consider). Diode 56 conducts with a low series resistance when the output 46 is at a higher voltage than the integrator 50 because the diode 56 is then forward biased. When the voltage at follower output 46 is lower than the integrator voltage, the diode is reverse biased and its series resistance is much higher. Accordingly, diode 56 blocks discharge of the integrator through the follower output, allowing the capacitor to discharge through parallel resistor 72.

The detector is preferably substantially more responsive to darkening (i.e., due to marks) than to lightening (i.e., due to other effects such as flutter). Similarly, because the reflectivity of the card itself causes a substantial increase in the output level of phototransistor 30 when the leading edge of the card reaches the reader, diode 56 causes the apparatus to quickly adapt to the required threshold for sensing marks on the card.

Both the follower amplifier and the comparator are preferably high gain operational amplifiers. Suitable voltage supply particulars, decoupling capacitors and the like can be connected to the amplifiers in accordance with manufacturer specifications and as known in the art. As shown in FIG. 4, the output of the comparator can be clamped between ground and the positive DC voltage supply, preferably through a series resistor, to shift the level of the output 68 of comparator 60 to levels appropriate for digital inputs, for example for TTL or CMOS inputs. Due to its high gain, the output of the operational amplifier defining the comparator is always either high or low, thereby digitizing the signal. The output state of the comparator can be sampled or loaded into downstream digital circuit packages (not shown) at an appropriate instant, for example as determined by detection of timing marks printed on the card. The timing marks can likewise be detected using a channel of the apparatus according to the invention. Inasmuch as printed marks are more dependably detectable than hand written ones, it is furthermore possible to set a lower threshold for the channel used to detect timing marks than the approximately 89-93% level considered optimal for detecting handwritten marks.

FIG. 5 is a signal diagram showing a theoretically perfect read signal 26 and threshold signal 26, and shows the effect of integrator 50 on the substantially digital (bi-level) perfect input signal which might result from a timing mark printed on the card, or a handwritten mark of sufficient size and uniform darkness to place the phototransistor in saturation during the passage of the mark. As shown in FIG. 5, the threshold signal 66 is characterized by an exponential decay during the low state of input signal 26, and an exponential charging during the high state, such charging continuing until the threshold reaches the percentage of the high level defined by the voltage divider. The threshold level can be switchable in accordance with the alternative embodiment of the invention shown in FIG. 7. Such operation can be used to employ a different threshold when sensing the card edge, or for re-reading a card that was not successfully read at a different threshold. Switching occurs at the dotted line under control of external control elements (not shown). Of course, the threshold can be switched upwardly or downwardly as appropriate, and two or more discrete threshold levels can be made selectable.

In FIG. 7, three additional operational amplifiers are included to amplify and level shift a signal from the photodetector before feeding the signal into the data detector section. This initial processing of the signal allows a photodetector arranged to read one of the tracks on the marked form to be used to generate a signal that defines when a form is located beneath the photodetector. The output of this photodetector's channel remains true when the data bearing record is passing the remaining photodetectors in the apparatus and accordingly can be used as a gating signal to enable data detection only when the form is in position and valid data is expected. In other respects, the circuit is somewhat similar to that of FIG. 4, namely including follower 40, comparator 60, integrator 50 and a voltage divider 80. However, the voltage divider in this case is affected by the serial resistance 74 of an additional serially connected diode 56, in this case located outside of the feedback loop of the follower amplifier, together with one or both of resistors 72, 84. When switching transistor 82 is not conducting, the resistance from the integrator 50 to ground is substantially defined by the value of resistor 72. When switching transistor 82 is conducting, the resistance from the integrator to ground is defined substantially by the parallel resistance of resistors 72, 84. This has the effect of making the threshold of comparator 60 switchable as shown graphically in FIG. 5 at the dotted line.

In the real world, the signals appear substantially more like the signals shown in FIG. 6. Nevertheless, by adaptively controlling the threshold to a percentage of the average value of the input signal in accordance with the invention, it is possible to dependably detect handwritten marks on cards even where the marks vary in their character and darkness.

As noted above, the mark discriminating apparatus of the invention is preferably used for each of the channels of the card reader. FIG. 8 is a block diagram showing an embodiment of the invention including a plurality of channels and an edge detection feature for enabling reading of data during the presence of a form. The edge detector 132 can be used to enable a data detector circuit to read a timing track on the form or to supply a bi-level (digital) signal that defines the interval during which the marked form is being moved past the bank of photodetectors. The basic function of the apparatus is to convert the analog outputs of the sensing apparatus 120 into digital outputs 140, using a plurality of detector channels according to the invention, these channels forming the data detector block 130 in FIG. 8.

The invention as disclosed and claimed herein is an apparatus for discriminating reflective variations 22 on an illuminated surface 24, including at least one photodetector 30 operable to produce an input signal 26 in response to reflections of the illuminated surface 24. A first amplifier 40 is connected as a follower amplifier, the first amplifier 40 having a non-inverting input 42 to which said input signal 26 is applied and an inverting input 44 connected to an output 46 of the first amplifier 40. An integrator 50 is connected to sense the output 46 of the first amplifier 40, the integrator 50 including a resistor 52 in series with the output 46 of the first amplifier 40 and a capacitor 54 in parallel with the resistor 52. A second amplifier 60 is connected as a comparator, the second amplifier 60 having a non-inverting input 62 and an inverting input 64, said non-inverting and inverting inputs 62, 64 being connected to the integrator 50 and to the non-inverting input 42 of the first amplifier 40, respectively. The integrator 50 defines a threshold level 66 of the comparator or second amplifier 60, an output 68 of the second amplifier 60 changing state in response to said input signal exceeding the threshold and the threshold being a predetermined proportion of a time-varying average of the input signal. A resistor 74 is included in parallel with the capacitor 54, the predetermined proportion being defined substantially by proportionate values of the resistor 52 in series with the capacitor 54 and the resistor 72 in parallel with the capacitor 54. A transistor or other switching means 82 can switch said resistance 72 between at least two discrete values, the predetermined proportion being thereby switchable and defined substantially by proportionate values of the resistor 52 in series with the capacitor 54 and the switchable resistance 84 in parallel with the capacitor 54. The photodetector 30 preferably includes one of a photodiode and a phototransistor connected between a positive DC level and said non-inverting input 42 of the first amplifier 40 through a series resistance 34 and a parallel resistance 36. A diode can be placed in series with the output of the follower amplifier to block discharge of the integrator through the follower amplifier. The integration rate defined by the integrator is preferably arranged such that the integrator is more quickly charged than discharged, allowing weighting in favor of detection of marks.

The invention is likewise characterized as an apparatus for discriminating reflective variations on an illuminated surface 24, 90, the illuminated surface 24 having a plurality of tracks with potential reflective variations 22 occurring at discrete positions thereon. At least one photodetector 30 is provided for each of the tracks, each said photodetector 30 being operable to produce an input signal 26 for a respective one of the tracks in response to reflections of the illuminated surface 24, 90. A follower amplifier 40 for each of the tracks, having a non-inverting input 42, an inverting input 44 and an output 46, said input signal 26 being applied to the non-inverting input 42, the output 46 being at least indirectly connected to the inverting input 44, whereby the output 46 follows the input signal 26. An integrator 50 for each of the tracks is connected to the output 46 of the follower amplifier, 40 the integrator 50 producing a time varying average of the output of the follower amplifier. A comparator 60 for each of the tracks, has two inputs 62, 64 and an output 68, the output 68 changing state as a function of a comparison of levels of the two inputs, one of said two inputs being connected to the integrator 50 such that a threshold level 66 of the comparator 60 is determined by said time varying average, and another of the two inputs being connected at least indirectly to the input signal 26 from the photodetector 30.

A rectifier diode 56 can be connected to the output 46 of the amplifier 40 defining the follower amplifier 40, preferably within a feedback loop of the follower. Resistors in series and parallel with a capacitor, respectively, define time constants for the integrator. The time constants can be different, preferably allowing a relatively faster response to excursions of the signal representing marks.

A voltage divider 80 can be provided on said one of the two inputs 62, 64 to the comparator 60 connected to the integrator 50, the voltage divider 80 defining a predetermined proportion of the time varying average as the threshold level of the comparator 60. The predetermined proportion can be, for example, 89–95% of the time varying average, preferably approximately 93% of the time varying average. The predetermined proportion can be switchable to two or more selectable proportions by including means for switching at least one resistor of the voltage divider for changing the predetermined proportion of the time varying average. For example, the predetermined proportion can be switchable between about 75% and about 93% of the time varying average. The switching means preferably includes a switchable resistance defined by a switching transistor and a resistor connected in series with one another, the switchable resistance being connected in parallel with the integrator, the voltage divider having a series resistance connected between the follower amplifier and the comparator and a parallel resistance connected in parallel with the switchable resistance.

The illuminated surface is typically a manually marked sheet as used for player selection of lottery numbers on lottery entry forms, or other media wherein potential marks define tracks corresponding to rows disposed laterally and/or longitudinally along a feed direction of the sheet.

The invention can be seen to be a method of discriminating one of marks and holes in a sheet, including feeding the sheet relatively along an array of photodetectors and illuminating the sheet at least in an area of the photodetectors; averaging an output signal from each of the photodetectors in the array; dividing the output signal as averaged to obtain a predetermined proportion of an average level of the output signal; comparing the output signal to the predetermined proportion of the average level for each of the photodetectors in the array; and, determining presence of said one of marks and holes by a result of said comparing step. Preferably, the method also includes weighting the averaging of the output signal to respond more quickly to changes in the output signal in one of an increasing and decreasing direction thereof, whereby the comparison is made less sensitive to changes in an other of the increasing and decreasing direction. This can be accomplished by providing different time constants for an integrator used to accumulate the average. The predetermined proportion employed in comparing the signal level to the threshold (i.e., integrated average) can be switchable in response to detected attributes of the sheet. Detectors according to this description can be used for both mark detection and form presence detection, the latter producing a signal for gating valid data from detectors used for mark detection.

The invention having been disclosed, a number of additional alternatives and variations will now become apparent to persons skilled in the art. Reference should be made to the appended claims rather than the foregoing specification as indicating the true scope of the invention in which exclusive rights are claimed.

I claim:

1. An apparatus for discriminating reflective variations on an illuminated surface, comprising:
    at least one photodetector operable to produce an input signal in response to reflections of the illuminated surface;
    a first amplifier connected as a follower amplifier, the first amplifier having a non-inverting input to which said input signal is applied and an inverting input connected to sense an output of the first amplifier;
    an integrator connected to sense the output of the first amplifier, the integrator including a resistor in series with the output of the first amplifier and a capacitor in parallel with the resistor;
    a second amplifier connected as a comparator, the second amplifier having a non-inverting input and an inverting input, said non-inverting and inverting inputs being connected to the integrator and to the non-inverting input of the first amplifier, respectively, the integrator defining a threshold level of the comparator, an output of the second amplifier changing state in response to said input signal exceeding the threshold and the threshold being a predetermined proportion of a time-varying average of the input signal.

2. The apparatus of claim 1, wherein the integrator is a dual rate integrator having a relatively faster response to signals representing marks.

3. The apparatus of claim 1, wherein the integrator comprises with an output of the follower amplifier a series resistance, a parallel capacitance and a parallel resistance, and further comprising a diode connected to conduct from an output of the first amplifier to the integrator, said integrator having different time constants for charging and discharging the capacitor, and the diode blocking discharge of the capacitor through the output of the first amplifier.

4. The apparatus of claim 1, further comprising a resistor in parallel with the capacitor, the predetermined proportion being defined substantially by proportionate values of the resistor in series with the capacitor and the resistor in parallel with the capacitor.

5. The apparatus of claim 1, further comprising a resistance in parallel with the capacitor and means for switching said resistance between at least two discrete values, the predetermined proportion being thereby switchable and defined substantially by proportionate values of the resistor in series with the capacitor and the resistance in parallel with the capacitor.

6. The apparatus of claim 1, wherein the photodetector includes one of a photodiode and a phototransistor connected between a positive DC level and said non-inverting input of the first amplifier through a series resistance and a parallel resistance.

7. A method of discriminating marks on a sheet, comprising the steps of:
    feeding the sheet relative to an array of photodetectors and illuminating the sheet at least in an area of the photodetectors;
    averaging an output signal from each of the photodetectors in the array;
    dividing the output signal as averaged to obtain a predetermined proportion of an average level of the output signal;
    comparing the output signal to the predetermined proportion of the average level for each of the photodetectors in the array;
    detecting presence of the sheet as a result of said comparing step for at least one channel of a plurality of detection channels connected to the array of photodetectors, and enabling data detection for remaining ones of the plurality of detection channels when a sheet is sensed to be present; and
    determining presence of said marks by a result of said comparing step.

8. The method of claim 7, further comprising weighting the averaging of the output signal to respond more quickly to changes in the output signal in one of an increasing and decreasing direction thereof, whereby the comparison is less sensitive to changes in an other of the increasing and decreasing direction.

9. The method of claim 8, further comprising switching the predetermined proportion in response to detected attributes of the sheet.

10. The method of claim 8, wherein the averaging includes integrating an output of the follower at different time constants for increases and decreases in the output of the follower.

* * * * *